US012114281B2

(12) United States Patent
Khoryaev et al.

(10) Patent No.: US 12,114,281 B2
(45) Date of Patent: Oct. 8, 2024

(54) TECHNIQUES FOR IMPROVING NEW RADIO (NR) POSITIONING PERFORMANCE

(71) Applicant: Apple Inc., Cupertino, CA (US)

(72) Inventors: Alexey Khoryaev, Nizhny Novgorod (RU); Sergey Sosnin, Zavolzhie (RU); Seung Hee Han, San Jose, CA (US); Mikhail Shilov, Nizhny Novgorod (RU); Yi Guo, Shanghai (CN)

(73) Assignee: Apple Inc., Cupertino, CA (US)

( * ) Notice: Subject to any disclaimer, the term of this patent is extended or adjusted under 35 U.S.C. 154(b) by 629 days.

(21) Appl. No.: 17/280,207

(22) PCT Filed: Sep. 26, 2019

(86) PCT No.: PCT/US2019/053096
§ 371 (c)(1),
(2) Date: Mar. 26, 2021

(87) PCT Pub. No.: WO2020/069083
PCT Pub. Date: Apr. 2, 2020

(65) Prior Publication Data
US 2022/0039048 A1  Feb. 3, 2022

Related U.S. Application Data

(60) Provisional application No. 62/739,028, filed on Sep. 28, 2018.

(51) Int. Cl.
*H04W 64/00* (2009.01)
*G01S 5/02* (2010.01)
(Continued)

(52) U.S. Cl.
CPC .............. *H04W 64/00* (2013.01); *G01S 5/10* (2013.01)

(58) Field of Classification Search
CPC ........ H04W 64/00; H04W 64/003; G01S 5/10
See application file for complete search history.

(56) References Cited

U.S. PATENT DOCUMENTS 9,445,237 B1   9/2016 Nallampatti Ekambaram
2011/0221635 A1   9/2011 Wang
(Continued)

FOREIGN PATENT DOCUMENTS

CN   105874856 A   8/2016
CN   107211248 A   9/2017
(Continued)

OTHER PUBLICATIONS

Nokia et al: "RSTD Reporting Enhancement in OTDOA" 3GPP Draft; R1-1610215; RAN WGI; Oct. 9, 2016.
(Continued)

*Primary Examiner* — Moustapha Diaby
(74) *Attorney, Agent, or Firm* — Eschweiler & Potashnik, LLC (57) ABSTRACT

Systems, methods, and circuitries are disclosed for determining a position of a wireless device. In one example, an apparatus for a first wireless communication device including baseband circuitry having a radio frequency (RF) interface configured to transmit and receive RF signals is provided. The apparatus includes one or more processors configured to process a signal received from a second wireless communication device to identify at least first arrival path and a different arrival path between the first wireless communication device and the second wireless communication device; and determine a location of the second wireless communication device based on the first arrival path and the different arrival path.

9 Claims, 3 Drawing Sheets

(51) Int. Cl.
    *G01S 5/10*     (2006.01)
    *H04W 4/02*     (2018.01)

(56) References Cited

U.S. PATENT DOCUMENTS

| | | |
|---|---|---|
| 2016/0269859 A1 | 9/2016 | Nallampatti Ekambaram et al. |
| 2016/0295374 A1 | 10/2016 | Persson et al. |
| 2017/0272987 A1 | 9/2017 | Han et al. |
| 2018/0091286 A1 | 3/2018 | Prechner |
| 2018/0160389 A1* | 6/2018 | Yerramalli ............ H04W 64/00 |

FOREIGN PATENT DOCUMENTS

| | | |
|---|---|---|
| CN | 107466370 A | 12/2017 |
| EP | 3321709 A1 | 5/2018 |
| IN | 201647037681 A | 12/2016 |
| JP | 2006060710 A | 3/2006 |
| JP | 2006060710 A1 | 3/2006 |
| KR | 20180087819 A | 8/2018 |
| KR | 1020180087819 A1 | 8/2018 |
| WO | 2016122761 A1 | 8/2016 |

OTHER PUBLICATIONS

Ryden Henrick et al; "Cellular Network Positioning Performance Improvements by richer device reporting"; Jun. 3, 2018.

Ericsson et al; "Multipath RSTD reporting per cell for enhanced indoor positioning"; 3GPP draft; R1-1610383; RAN WG1; Oct. 9, 2016.

EP Search Report; EP19867560; May 11, 2022.

International Preliminary Report on Patentability dated Mar. 23, 2021 for International Application No. PCT/US2019/053096.

International Search Report dated Jan. 10, 2020 for International Application No. PCT/US2019/053096.

Ericsson; "OTDOA and E-CID positioning for feMTC"; 3GPP Draft; R2-1701037; vol. RAN WG2; Feb. 12, 2017.

3rd Generation Partnership Project; Technical Specification Group Radio Access Network; Study on indoor positioning enhancements for UTRA and LTE (Release 13); vol. RAN WG1, No. v13.1.0; Dec. 7, 2015.

European Extended Search Report mailed on Jan. 27, 2023 in connection with EP Application No. 22203685.7.

* cited by examiner

TECHNIQUES FOR IMPROVING NEW RADIO (NR) POSITIONING PERFORMANCE

CROSS REFERENCE TO RELATED APPLICATIONS

This application is a National Phase entry application of International Patent Application No. PCT/US2019/053096 filed Sep. 26, 2019, which claims priority to U.S. Provisional Patent Application Number 62/739,028 filed on Sep. 28, 2018, entitled "TECHNIQUES FOR IMPROVING NEW RADIO (NR) POSITIONING PERFORMANCE," and is hereby incorporated by reference in its entirety.

BACKGROUND

Various examples generally may relate to the field of wireless communications.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various examples. However, it will be apparent to those skilled in the art having the benefit of the present disclosure that the various aspects of the various examples may be practiced in other examples that depart from these specific details. In certain instances, descriptions of well-known devices, circuits, and methods are omitted so as not to obscure the description of the various examples with unnecessary detail. For the purposes of the present document, the phrase "A or B" means (A), (B), or (A and B).

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various examples. However, it will be apparent to those skilled in the art having the benefit of the present disclosure that the various aspects of the various examples may be practiced in other examples that depart from these specific details. In certain instances, descriptions of well-known devices, circuits, and methods are omitted so as not to obscure the description of the various examples with unnecessary detail. For the purposes of the present document, the phrase "A or B" means (A), (B), or (A and B).

Figure 1:
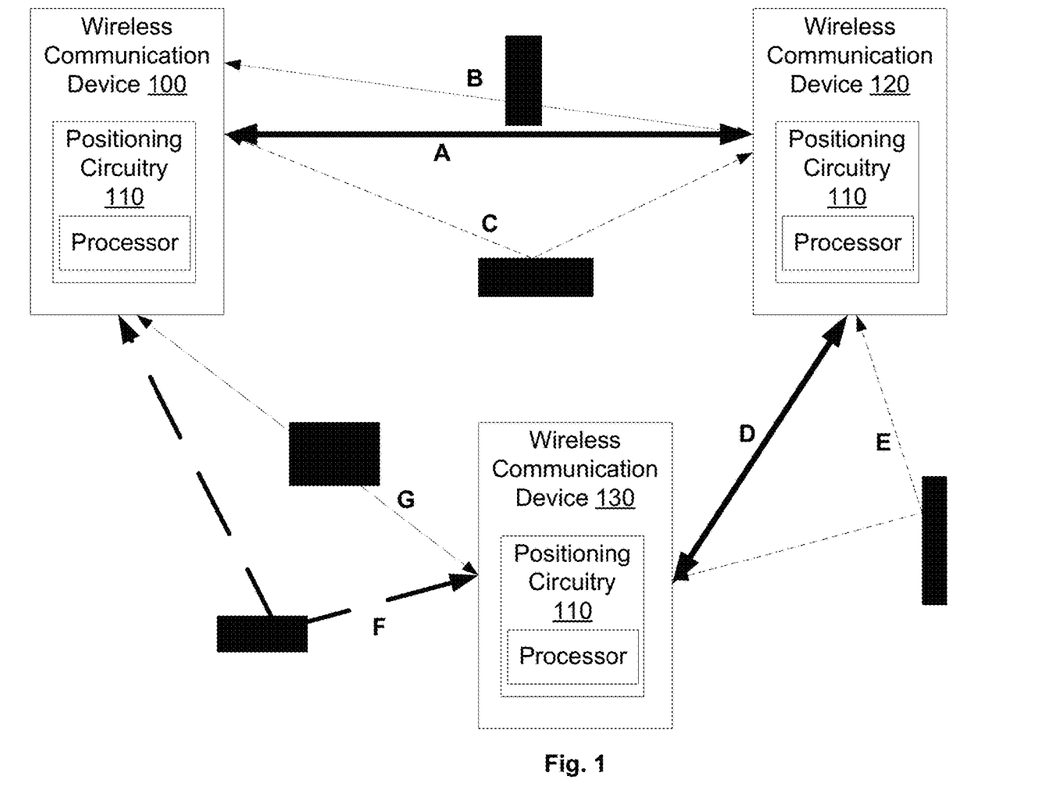
FIG. 1 depicts an exemplary wireless communication network in accordance with some examples.

FIG. 1 is a block diagram of a wireless communication network that includes three wireless communication devices 100, 120, and 130 separated by distance and several physical obstacles. The wireless communication devices may be UEs or base stations/gNBs. There are multiple paths or channels between the devices, a few of which are depicted in FIG. 1. For example, a primary or best path between each pair of devices is depicted in heavy line. A direct "line of sight" (LOS) path is shown in solid line while a reflected path is shown in dashed line. A path that significantly attenuates signals due to a physical obstacle is shown in dotted line. Thus, it can be seen that between devices 100 and 120, there is a LOS path A, an attenuated path B, and a reflected path C, with path A being the best path. Between devices 100 and 130 there is a reflected path F, which is the best path and an attenuated path G. Between devices 120 and 130 there is a LOS path D, which is the best path and a reflected path E. While a few paths between the devices are illustrated, in practice many more paths between devices will usually be present.

Each device includes positioning circuitry 110 having one or more processors that analyze received signals to determine a position of another device in the network. The one or more processors also generate signals that communicate information to another device that may be used by the other device to determine the originating device's location.

As of today, cellular wireless technologies rely on an estimation of signal location parameters to extract information about propagation distance or a relative difference of propagation distances between transmitter(s) of the reference signal(s) and receiver node(s). Signal location parameters include received reference signal time difference (RSTD), timing advance or round-trip time measurements, angle of arrival or departure, and so on. In particular, in LTE Observed Time Difference of Arrival OTDOA technology, base stations (e.g., eNB, gNB) transmit positioning reference signals (PRS) and other reference signals. These signals can be used at the user equipment device (UE) receiver side to measure time difference of signal arrival (RSTD) for signals from different cells/base stations with respect to reference cell. The measured RSTD values are reported back to the base station using higher layer positioning protocols so that the base station may determine the geographical coordinates of the target UE. In addition to RSTD reporting, the UE may report metrics characterizing uncertainty/standard deviation of the RSTD measurements or reference signal received power (RSRP) or quality (RSRQ).

Existing positioning schemes present several drawbacks. For example, in many instances, the UE reports only subset of signal location parameters such as RSTD, RTT, cell ID, RSRP, RSRQ and so on. This subset of signal location parameters may not be sufficient or may not provide full information that may be relevant to UE location. In addition, a lot of potentially useful information about various signal location parameters contained in received signals is not reported by the UE to the network.

Further, often UEs need to perform sophisticated detection and estimation algorithms to measure signal location parameters from multiple cells. These algorithms are typically of high computation complexity. In addition, super-resolution algorithms having extremely high computational complexity (e.g. MUSIC, etc.) may not be feasible for most UEs.

An additional difficulty in positioning schemes is that synchronization across bases stations may become a bottleneck for accurate positioning.

Described herein are exemplary systems, apparatus, circuitry, and methods related to signaling for enhanced positioning in cellular wireless communication networks of the next generation cellular systems such as for example 3GPP LTE R16+ and 3GPP NR R16+. The proposed systems, apparatus, circuitry, and methods are in general applicable to any type of wireless communication system and improve the accuracy of UE positioning.

For the purposes of this description signal location parameters (SLP) are parameters of a signal that can be applied for the purpose of user positioning. SLPs include as phase difference, time of arrival, time difference of arrival, propagation time/delays, angle of arrivals/departures, received reference signal powers, and any other information that can be relevant to facilitating estimation of UE geographical coordinates.

For the purposes of this description positioning reference signals (PRS) are the signals sent by cells/eNB/gNB/TRPs/Network Entities or UEs that are used to measure SLPs for determining a UE location. PRSs can be specifically designed sequences and signals with good cross and autocorrelation properties or any data transmission depending on implementation and measurement and reporting type.

For the purposes of this description reference resources are the resources where PRS are transmitted. The reference resource is characterized by a stamp/ID that can be configured by higher layer signaling and may be configured to UE for measurement and reporting.

Several new techniques for improving the determination of UE position will now be described. These techniques may be implemented as positioning circuitry 110 or an apparatus that includes positioning circuitry, or a method performed by positioning circuitry, or a set of functions performed by positioning circuitry, and so on.

New Source Types of Location Information

In addition to using PRS, the positioning circuitry can be configured to provide or interpret at least one of the following types of sources of location information. Any received waveform (not necessarily PRS) can include raw information that can be processed to extract information about signal location parameters. For example, the UE may simply transmit to the reference base station a signal containing a digitized electromagnetic waveform representative of the signal received from the base station(s) without any significant processing. The base station or the network work can use a priori knowledge about the signal(s) as compared to the re-transmitted version received from the UE for SLP measurement and, as a result, for determination of location information for the UE. In another example, the UE may transmit to the reference base station a message containing the estimated channel(s) for each received signal transmitted by the base station(s). The base station or the network can process the re-transmitted signal to measure SLPs and determine information about the UE's location.

UEs collect information about a first arrival path (FAP) for use in beamforming and other purposes. FAP information for signals received by the UE from at least three different base stations can be used to determine the UE's location. Post-processed first arrival path information, including timing, timing difference, path power, angular information, and so on, may also be used determine information about the UE's location that can be transmitted to the base station.

Figure 2:
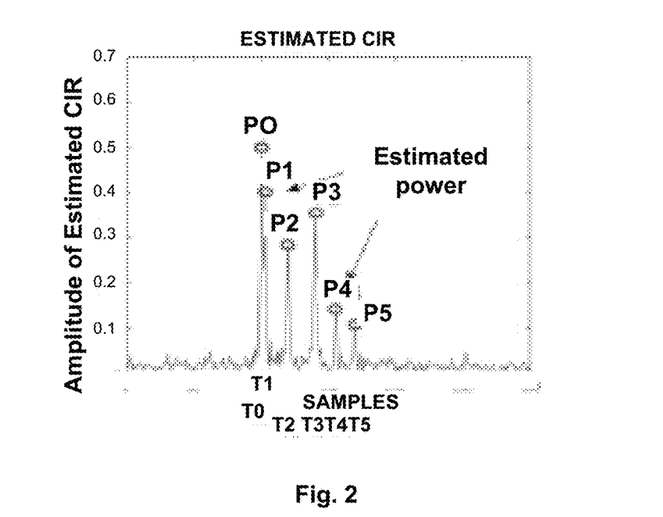
FIG. 2 depicts an exemplary channel impulse response.

UEs also collect information about other paths or channels between the UE and another device. This post-processed multi-path information, including timing, timing difference, path power, angular information, and so on, may be used determine information about the UE's location that can be transmitted to the base station. FIG. 2 illustrates an estimated channel impulse response (CIR) that is determined by a UE based on a received signal from a base station. It can be seen that there are six different paths as indicated by the peaks at six different times (on a sample basis) in the CIR. Using additional paths from the base station may allow the UE's location to be determined based on signals from fewer than three base stations.

Spoofing Protection

Spoofing may result in inaccurate positioning. In spoofing a false device transmits positioning signals to degrade the accuracy of a UE's determine position. In order to prevent spoofing, a UE may re-transmit a predetermined waveform received from the base station as described above. One benefit of this method is that waveform is known only to gNB/Location server and its transmission resources are exchanged only between UE and gNB/location server in UE specific manner. Therefore the re-transmission of a predetermined received waveform can be used as a reliable method against spoofing.

Another approach to protecting against spoofing is to use a UE specific configuration of PRS transmission parameters. In this technique, the PRS or ranging signals are dependent on parameters know only to UE and possibly a location server. Therefore PRS sequence generation as well as PRS transmission is dependent on UE specific parameters. In order to achieve this, the UE can be configured with UE specific parameters for PRS sequence generation and PRS transmission. The UE can reproduce these signals for reception and estimation of SLPs. Such parameters may include a UE specific PRS ID, used for initialization of PRS sequence or UE specific rules for generation of PRS signals, so that only the target UE can reproduce these signals.

Over the Air Synchronization Across gNBs/TRPs

The positioning accuracy of timing-based techniques depends on synchronization accuracy of gNBs involved in positioning procedure. When the coordinates of base stations are not known, base stations (e.g., gNBs/TRPs) can perform a ranging procedure to estimate round-trip time or time of flight. The distance between nodes can be estimated based on these estimations to improve the accuracy of synchronization. The DL PRS transmissions transmitted by gNBs/TRPs can be re-used for that purpose.

Figure 3:
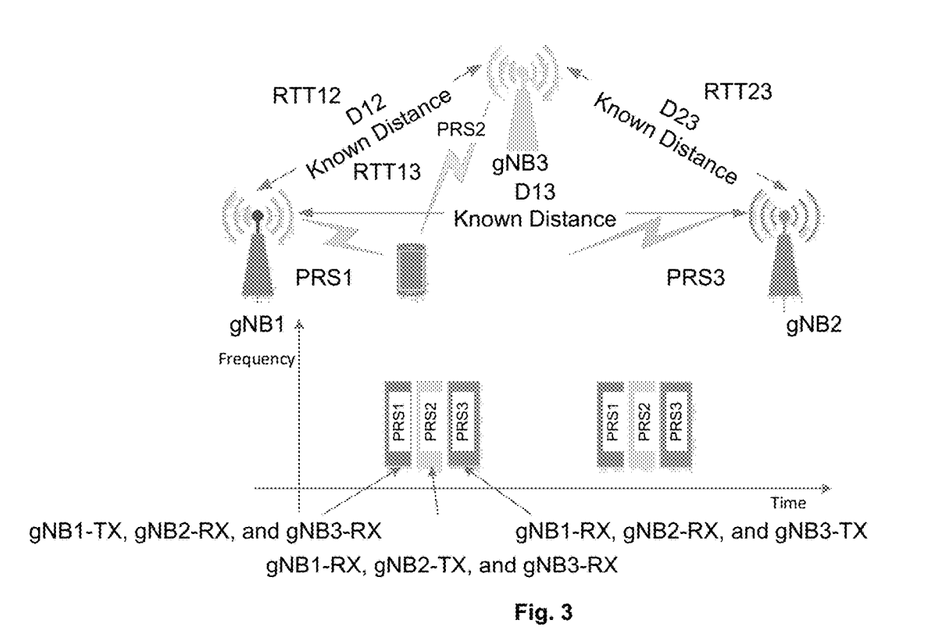
FIG. 3 illustrates an exemplary synchronization technique for base stations in accordance with some examples.

When the coordinates of base stations are known, this information can be used for over-the air synchronization. As illustrated in FIG. 3, the "known" RTT (round trip time) and ToF (time of flight) between based stations can be determined based on the coordinates of the base stations. This known distance can be compared with the estimated distance derived from the measured RTT/ToF and used to estimate a synchronization error or offset between base stations.

In the example illustrated in FIG. 3, D12 is the known distance between gNB1 and gNB2 and RTT12 is the measured distance between gNB1 and gNB2. D13 is the known distance between gNB1 and gNB3 and RTT13 is the measured distance between gNB1 and gNB3. D23 is the known distance between gNB2 and gNB3 and RTT23 is the measured distance between gNB2 and gNB3. Further, it is known that PRS1 is transmitted by gNB1 and is received by gNB2 and gNB3, PRS2 is transmitted by gNB2 and is received by gNB1 and gNB3, and PRS3 is transmitted by gNB3 and is received by gNB1 and gNB2. The synchronization error or offset between gNB1 and gNB2 ($\Delta 12$) can be estimated based on the measured distance RTT12 and the known distance D12 (i.e., $\Delta 12 = D12 - RTT12$). The synchronization error or offset between gNB1 and gNB3 ($\Delta 13$) can be estimated based on the measured distance RTT13 and the known distance D13 (i.e., Δ13=D13−RTT13). The estimated synchronization offsets can be signaled to the UE or location server and taken into account and compensated from UE measurements of SLPs.

Classification, Detection and Reporting of LOS/NLOS State

Either UEs or base stations may classify, detect, and/or report LOS status or non-LOS (NLOS) status for different channels/links between wireless devices. Referring back to FIG. 1, link A is LOS while link B is NLOS. Wireless communication device 120 or wireless communication device 100 may determine and report that the link A between these two physical locations is LOS. If obstacle B moves "down" and blocks link A, one or both of the devices 100, 120 may determine and report that the link A between these two physical locations is NLOS and may also determine and report that the link B between these two physical locations is now LOS. A confidence level may be associated with the link classification. To determine LOS/NLOS classification the UE or gNB can perform estimation of the first arrival path timing and further perform classification whether detected first arrival path component is a LOS or NLOS component. The classification can be done through analysis of signals transmitted with different polarizations. Another approach is to analyze frequency flatness characteristics or apply beamforming to measure power of the first arrival path.

If such measurements are done at UE or gNB side, a new report can be introduced (or information can be added to any existing report) to indicate additional information on LOS state and information on confidence level of LOS state for each radio-link between specific transmitter and receiver (e.g. TRP/gNB and UE).

From location point of view it is important to have an information about the estimated channel first arrival path (FAP) used for time delay, angle measurements, and so on. A UE which sends the positioning report can add the information whenever LOS or NLOS path are used to estimate measurements. Different techniques can be used to estimate the degree of LOS for a channel component. TX Polarization-based and/or channel transfer function (CTF)-based techniques may be used to determine LOS status. For example, the CTF flatness and correspondence to a single phase offset in frequency may be used to determine whether the channel is LOS.

Estimation of SLP Using Information from both FR1 and FR2 bands

For NR positioning, measurement of signal location parameters can be done using physical layer transmissions in FR1 (e.g., sub-6 GHz with bandwidth of up to 100 MHz) and/or FR2 (e.g., 24.25-52.6 GHz with bandwidth of up to 400 MHz) frequency bands. A gNB or UE can use measurements in one band to assist or refine measurements in another band relying on channel correlation across frequency bands.

For instance, relatively coarse measurements made in FR1 (e.g. RTT or RSTD) can be refined by transmissions and measurements in FR2 (fine measurement). One example is that coarse timing can be measured in FR1 and then the measurement window can be shared and used for measurements in FR2.

A gNB or UE can use estimates of SLPs from one frequency band (e.g. FR1) such as propagation delay, angle of arrival, coordinates, etc., for estimation of SLPs or their subsequent refinement through estimation in another band (e.g. FR2).

A UE can perform a coarse/fine SLP measurement by processing a PRS received in low (FR1) or high (FR2) frequency band and then processing any other reference signal such as CSI-RS, PT-RS (phase tracking-RS), T-RS (tracking RS), and so on.

The UE can use one or a combination of following techniques for utilization of the obtained SLP measurements. The UE can use knowledge of the angle of arrival for the first arrival path for beamforming (e.g., the arrival path that maximizes power of the LOS channel component) to improve timing estimation performance In another example, the UE can use knowledge of the round trip time (propagation delay) for estimation of the angle of arrival assuming a known propagation delay between the UE and a gNB. The gNB transmits PRS using different beamforming or so called precoder switching/beam sweeping. The UE receives PRS signals transmitted with different beamforming and measures the power of the path of the channel impulse response which corresponds to a known propagation delay. The beamforming with maximum power on a path is used for LOS angle estimation. The coarse estimation of propagation delay (time delay)/angle obtained in FR1 is used for fine estimation of time delay/angle during the PRS processing from FR2. Rough knowledge of the UE's coordinates as well as gNB coordinates can be used to set synchronization windows for timing estimation. A beam matching procedure is performed, where a beam (information on transmit pre-coder) measured in one band is used to select a subset of beams (transmit pre-coders) in another band.

Path Power Measurements

For location algorithms, it is important to know path power used for estimation of signal location parameters. In order to measure the power of the specific path of the channel impulse response, the UE can use reference signals and estimate RX power carried by each detected multipath component of the CIR (see FIG. 2). Therefore in NR systems, new measurements can be introduced that aim to measure power of specific paths in the CIR.

For example, RSRP/RSRQ measurement may be made for the first arrival path or any n-th path component. The path power can be measured in absolute values or relative to the peak value of the channel impulse response. The per path measurement can be separately done per each TX and/or RX beam (TX and/or RX antenna port). In case of multiple RX antenna ports, path power measurement can be done per each RX port. In one example, the power of the FAP P0 can be used to determine whether the multi-path channel has been properly detected prior to using the associated measurements for location.

It can be seen from the foregoing description that the accuracy with which the location of a UE may be determined can be enhanced by using any or all of the described techniques.

Figure 4:
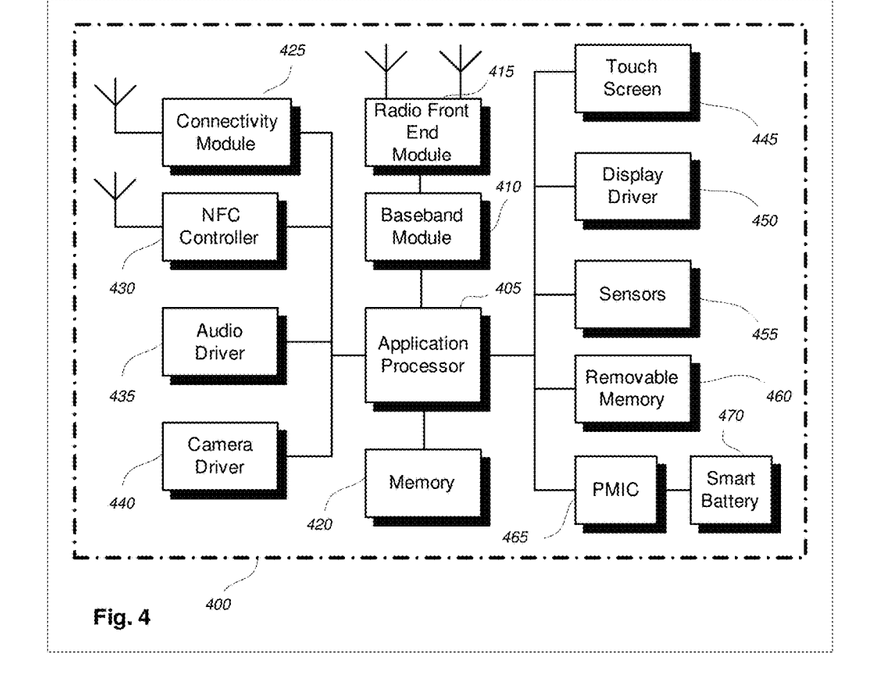
FIG. 4 illustrates a functional block diagram of an exemplary UE wireless communication device in accordance with some examples.

FIG. 4 illustrates a device 400 in accordance with an aspect. The user device 400 may be a mobile device or a UE in some aspects. The device 400 includes an application processor 405, baseband processor 410 (also referred to as a baseband module), radio front end module (RFEM) 415 (also referred to as a radio interface), memory 420, connectivity module 425, near field communication (NFC) controller 430, audio driver 435, camera driver 440, touch screen 445, display driver 450, sensors 455, removable memory 460, power management integrated circuit (PMIC) 465 and smart battery 470.

In some aspects, application processor 405 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 410 may be implemented, for example, as a solder-down substrate including one or more integrated circuits, a single packaged integrated circuit soldered to a main circuit board, and/or a multi-chip module containing two or more integrated circuits.

Figure 5:
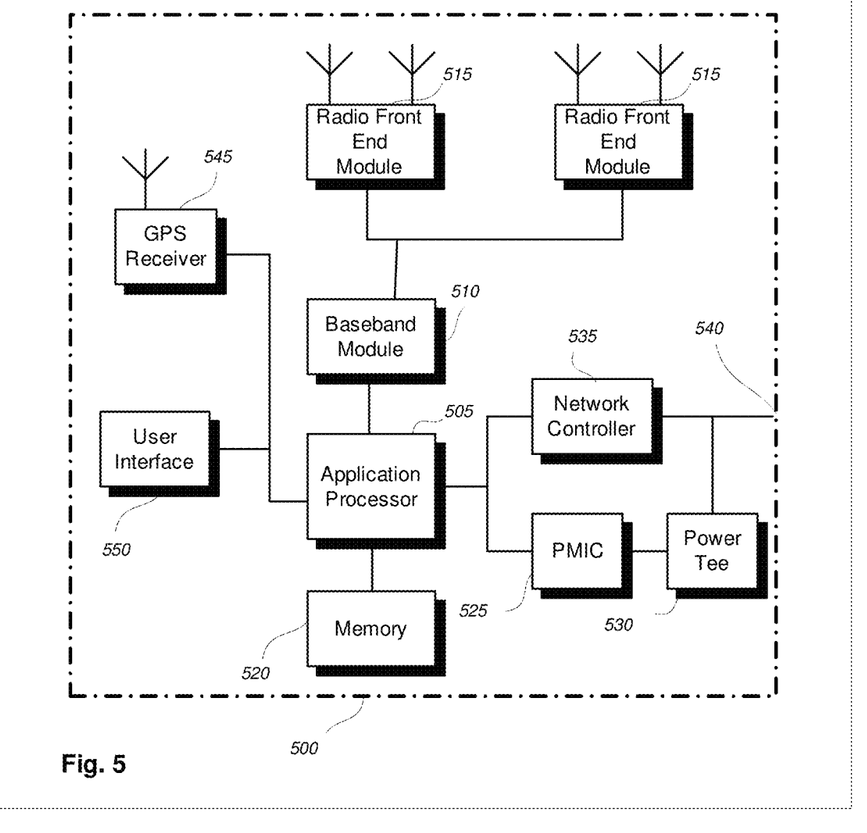
FIG. 5 illustrates a functional block diagram of an exemplary eNB wireless communication device in accordance with some examples.

FIG. 5 illustrates an example base station or gNB/TRP/eNB 500 in accordance with an aspect. The eNB 500 may include one or more of application processor 505, baseband modules 510 (also referred to as baseband processors), one or more radio front end modules 515 (also referred to as a radio interface), memory 520, power management circuitry 525, power tee circuitry 530, network controller 535, network interface connector 540, satellite navigation receiver module 545, and user interface 550.

In some aspects, application processor 505 may include one or more CPU cores and one or more of cache memory, low drop-out voltage regulators (LDOs), interrupt controllers, serial interfaces such as SPI, 120 or universal programmable serial interface module, real time clock (RTC), timer-counters including interval and watchdog timers, general purpose 10, memory card controllers such as SD/MMC or similar, USB interfaces, MIPI interfaces and Joint Test Access Group (JTAG) test access ports.

In some aspects, baseband processor 510 may be implemented, for example, as a solder-down substrate including one or more integrated circuits, a single packaged integrated circuit soldered to a main circuit board or a multi-chip module containing two or more integrated circuits.

In some aspects, memory 520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 520 may be implemented as one or more of solder down packaged integrated circuits, socketed memory modules and plug-in memory cards.

In some aspects, power management integrated circuitry 525 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 530 may provide for electrical power drawn from a network cable to provide both power supply and data connectivity to the base station radio head 500 using a single cable.

In some aspects, network controller 535 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 545 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 545 may provide data to application processor 505 which may include one or more of position data or time data. Application processor 505 may use time data to synchronize operations with other radio base stations.

In some aspects, user interface 550 may include one or more of physical or virtual buttons, such as a reset button, one or more indicators such as light emitting diodes (LEDs) and a display screen.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

For one or more examples, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 is an apparatus for a first wireless communication device including baseband circuitry having a radio frequency (RF) interface configured to transmit and receive RF signals. The apparatus includes one or more processors configured to: process a signal received from a second wireless communication device to identify at least first arrival path and a different arrival path between the first wireless communication device and the second wireless communication device; and determine a location of the second wireless communication device based on the first arrival path and the different arrival path.

Example 2 includes the subject matter of example 1, including or omitting optional elements, wherein the one or more processors are configured to identify the first arrival path and the different arrival path based on a channel impulse response of the signal.

Example 3 includes the subject matter of any one of examples 1-2, including or omitting optional elements, wherein the one or more processors are configured to determine the location based on one or more of a timing, timing difference, path power, or angular information of the first arrival path and the different arrival path.

Example 4 includes the subject matter of any one of examples 1-2, including or omitting optional elements, wherein the one or more processors are configured to determine the location based on one or more signal location parameters of a second signal received from the second wireless communication device.

Example 5 is an apparatus for a user equipment (UE) wireless communication device including baseband circuitry having a radio frequency (RF) interface configured to transmit and receive RF signals. The apparatus includes one or more processors configured to generate a positioning signal based on a parameter received from a second wireless communication device; and transmit the positioning signal to the second wireless communication device.

Example 6 includes the subject matter of example 5, including or omitting optional elements, wherein the parameter includes a waveform received from the second wireless communication device and the positioning signal includes the waveform.

Example 7 includes the subject matter of example 5, including or omitting optional elements, wherein the parameter includes a UE specific identifier and the positioning signal includes a positioning reference signal having parameters selected based on the UE specific identifier.

Example 8 includes the subject matter of example 5, including or omitting optional elements, wherein the one or more processors are configured to generate the positioning signal based on a rule received from the second wireless communication device.

Example 9 is an apparatus for a first global node B (gNB) wireless communication device including baseband circuitry having a radio frequency (RF) interface configured to transmit and receive RF signals. The apparatus includes one or more processors configured to determine a synchronization error between signals transmitted by the first gNB and a second gNB; and transmit a signal indicative of the synchronization error to a third wireless communication device, wherein the third wireless communication device compensates for the synchronization error to determine a position of the first gNB.

Example 10 includes the subject matter of example 9, including or omitting optional elements, wherein the one or more processors are configured to measure a distance between the first gNB and the second gNB based on a round trip time of a signal transmitted between the first gNB and the second gNB; and determine the synchronization error based on a difference between the measured distance and known distance between the first gNB and the second gNB.

Example 11 includes the subject matter of example 9, including or omitting optional elements, wherein the one or more processors are configured to estimate a location of the second gNB based on downlink positioning reference signals (PRS) transmitted by the second gNB; measure a distance between the first gNB and the second gNB based on a round trip time of a signal transmitted between the first gNB and the second gNB; and determine the synchronization error based on a difference between the measured distance and estimated distance between the first gNB and the second gNB.

Example 12 is an apparatus for a first wireless communication device including baseband circuitry having a radio frequency (RF) interface configured to transmit and receive RF signals. The apparatus includes one or more processors configured to: estimate a channel impulse response (CIR) of a signal received from a second wireless communication device; identify multiple arrival paths based on peaks in the CIR; estimate a power or quality of each of the multiple arrival paths based on an amplitude of a corresponding peak; and determine a location of the second wireless communication device based on the estimated power or quality of the multiple arrival paths.

Example 13 includes the subject matter of example 12, including or omitting optional elements, wherein the signal includes a position reference signal (PRS).

Example 14 includes the subject matter of example 12, including or omitting optional elements, wherein the one or more processors are configured to estimate separate CIRs based on signals received on different antennas of the first wireless communication device and to determine the location based on the separate CIRs.

Example 14 is an apparatus for a first wireless communication device including baseband circuitry having a radio frequency (RF) interface configured to transmit and receive RF signals. The apparatus includes one or more processors configured to classify a first radio link between the first wireless communication device and a second wireless communication device as either line of sight (LOS) or non-line of sight (NLOS); and transmit a first signal indicative of the first radio link classification to a third wireless device.

Example 16 includes the subject matter of example 15, including or omitting optional elements, wherein the one or more processors are configured to receive a second signal indicative of a second radio link classification for a second radio link between the first wireless communication device and a second wireless communication device; and estimate a location of the second wireless communication device based on the second radio link classification.

Example 17 includes the subject matter of example 16, including or omitting optional elements, wherein the one or more processors are configured to estimate the location of the second wireless communication device based on a confidence level associated with the second radio link classification.

Example 18 includes the subject matter of example 15, including or omitting optional elements, wherein the one or more processors are configured to classify the first radio link based on a polarization of a received signal.

Example 19 includes the subject matter of example 15, including or omitting optional elements, wherein the one or more processors are configured to classify the first radio link based on a channel transfer function of the first radio link.

Example 20 is an apparatus for a user equipment (UE) wireless communication device including baseband circuitry having a radio frequency (RF) interface configured to transmit and receive RF signals. The apparatus includes one or more processors configured to process a first signal received from a second wireless communication device in a first frequency band to determine a coarse location of the second wireless communication device; and process a second signal received from a second wireless communication device in a second frequency band to determine an improved location of the second wireless communication device.

Example 21 includes the subject matter of example 20, including or omitting optional elements, wherein the one or more processors are configured to identify a portion of the second signal related to the coarse location; and process the identified portion to determine the improved location.

Example 22 includes the subject matter of example 20, including or omitting optional elements, wherein the one or more processors are configured to process the first signal to identify a first arrival path; and adjust one or more device parameters to maximize reception of the second signal in the first arrival path.

Example 23 includes the subject matter of example 20, including or omitting optional elements, wherein the one or more processors are configured to process the first signal to estimate an angle of arrival; identify a beam in the second signal having the estimated angle of arrival; and determine the improved location based on the identified beam.

Any of the above described examples may be combined with any other example (or combination of examples), unless explicitly stated otherwise. The foregoing description of one or more implementations provides illustration and description, but is not intended to be exhaustive or to limit the scope of examples to the precise form disclosed. Modifications and variations are possible in light of the above teachings or may be acquired from practice of various examples.

We claim:

1. An apparatus, comprising:
a memory to store information; and
processing circuitry coupled with the memory, the processing circuitry configured to:
receive a sequence initialization parameter from a base station, wherein the sequence initialization parameter indicates a value used by the base station to initialize a sequence used to generate a positioning signal, wherein the sequence initialization parameter is transmitted in signaling that is specific to a target user equipment (UE); and
receive the positioning signal from the base station based on the sequence initialization parameter.

2. The apparatus of claim 1, wherein the sequence initialization parameter is only transmitted in signaling that is specific to the target UE.

3. The apparatus of claim 1, wherein the sequence initialization parameter is unique to the UE.

4. A user equipment (UE) comprising:
a memory; and
a processor configured to, when executing instructions stored in the memory:
receive a sequence initialization parameter from a base station, wherein the sequence initialization parameter indicates a value used by the base station to initialize a sequence used to generate a positioning signal, wherein the sequence initialization parameter is transmitted in signaling that is specific to the UE; and receive the positioning signal from the base station based on the sequence initialization parameter.

5. The UE of claim 4, wherein the sequence initialization parameter is only transmitted in signaling that is specific to a target UE.

6. The UE of claim 4, wherein the sequence initialization parameter is unique to the UE.

7. A method for a user equipment (UE) comprising:
receiving a sequence initialization parameter from a base station in signaling that is specific to the UE, wherein the sequence initialization parameter indicates a value used by the base station to initialize a sequence used to generate a positioning signal; and
receiving the positioning signal from the base station based on the sequence initialization parameter.

8. The method of claim 7, wherein the-sequence initialization parameter is only transmitted in signaling that is specific to a target UE.

9. The method of claim 7, wherein the sequence initialization parameter is unique to the UE.

* * * * *